Sept. 8, 1970  W. W. HOLES ET AL  3,527,632
PROCESS OF MAKING A LAMINATED PADDED ALBUM COVER
Filed Aug. 23, 1967  4 Sheets-Sheet 2

INVENTORS
WILLIAM W. HOLES,
EDWARD L. LIBBY
BY
Williamson, Palmatier
& Bains ATTORNEYS

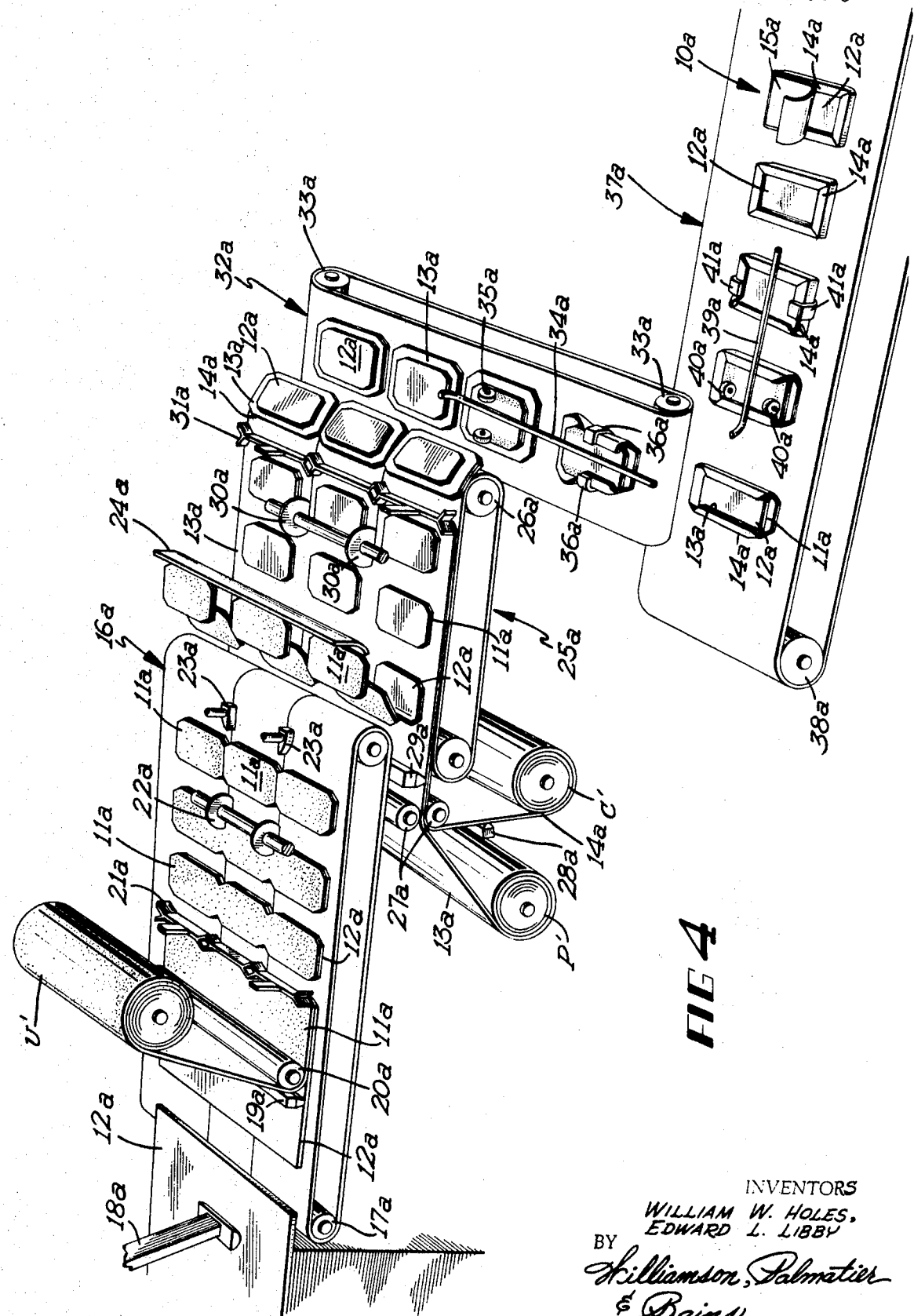

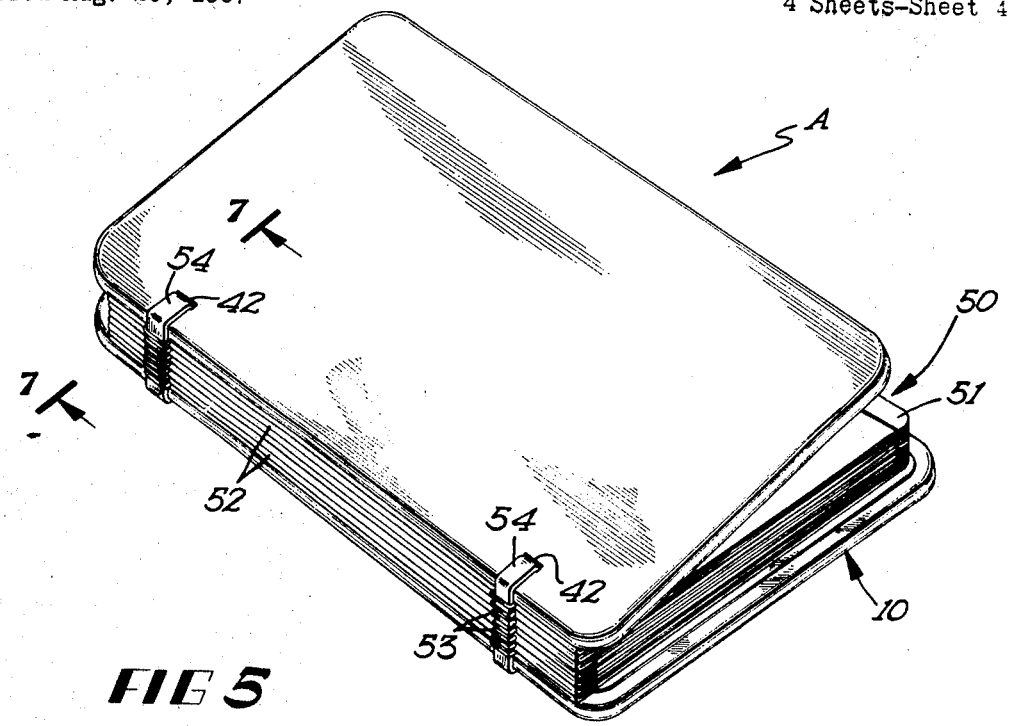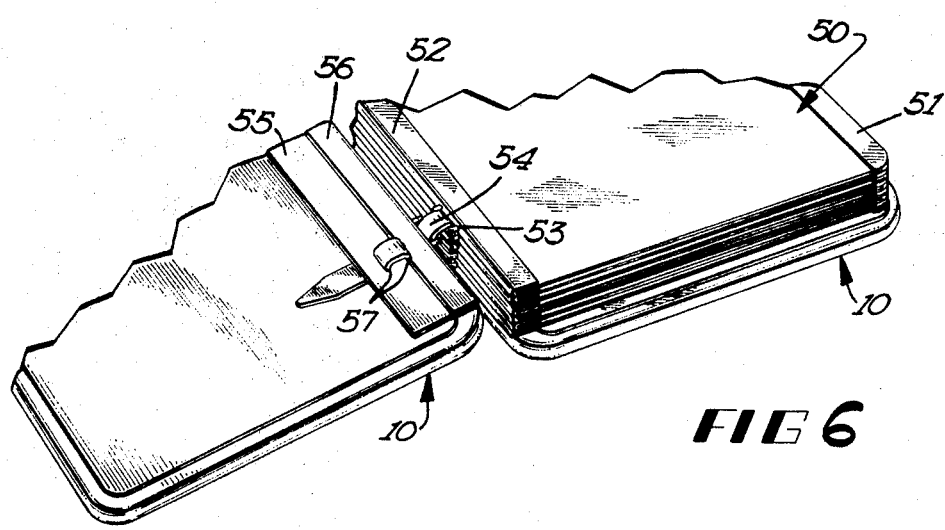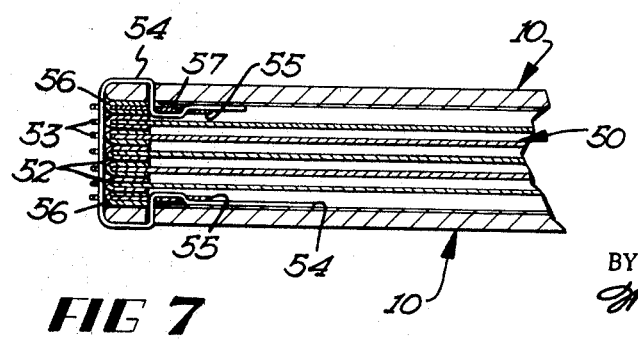

United States Patent Office 3,527,632
Patented Sept. 8, 1970

3,527,632
PROCESS OF MAKING A LAMINATED
PADDED ALBUM COVER
William W. Holes and Edward L. Libby, St. Cloud, Minn., assignors to The Holes-Webway Co., St. Cloud, Minn., a corporation of Minnesota
Filed Aug. 23, 1967, Ser. No. 662,616
Int. Cl. B32b 3/04
U.S. Cl. 156—216                                   2 Claims

ABSTRACT OF THE DISCLOSURE

A process of making laminated padded album covers comprises moving sheets of foamed plastic material and rigid paperboard sheets through a predetermined path of travel, and bonding the paperboard sheet to a foamed plastic sheet. Applying and bonding a flexible cover sheet to the plastic sheet and thereafter applying and bonding a flexible liner sheet to the paperboard sheet to form a multi-ply laminated album cover. Then applying a pressure applying medium to one longitudinal edge of the cover to form a plurality of slots therein.

---

This invention relates to an album having a plurality of pages and front and rear covers which are hingedly connected together.

An object of this invention is to provide a novel album, of simple and inexpensive construction, and method of making the same, which is comprised of front and rear covers, one of which is padded, and a plurality of album pages, each having external hinge elements affixed to one edge thereof, through which projects binding straps, which also pass through slots in the covers without the attendant shredding of the padding material of the padded cover.

A more specific object of this invention is to provide a novel and improved album and method of making the same, including front and rear covers, each comprised of a plurality of lamina or sheets including a yieldable resilient sheet, formed of expanded non-fibrous material, preferably polyurethane foam, which is bonded or laminated to other lamina, the padded covers having slot-like openings in the marginal edges thereof for accommodating the hinge strap of the hinge structure.

These and other objects and advantages of our invention will more fully appear from the following description made in connection with the accompanying drawings wherein like reference characters refer to the same or similar parts throughout the several views, and in which:

FIG. 4 is a modified form of the apparatus system used in carrying out the method of making the novel laminated padded album cover;

FIG. 5 is a perspective view of the novel album in an assembled closed condition;

FIG. 6 is a fragmentary perspective view of the album in the opened condition; and FIG. 7 is a cross-sectional view taken approximately along line 7—7 of FIG. 5 and looking in the direction of the arrows.

Figure 1:
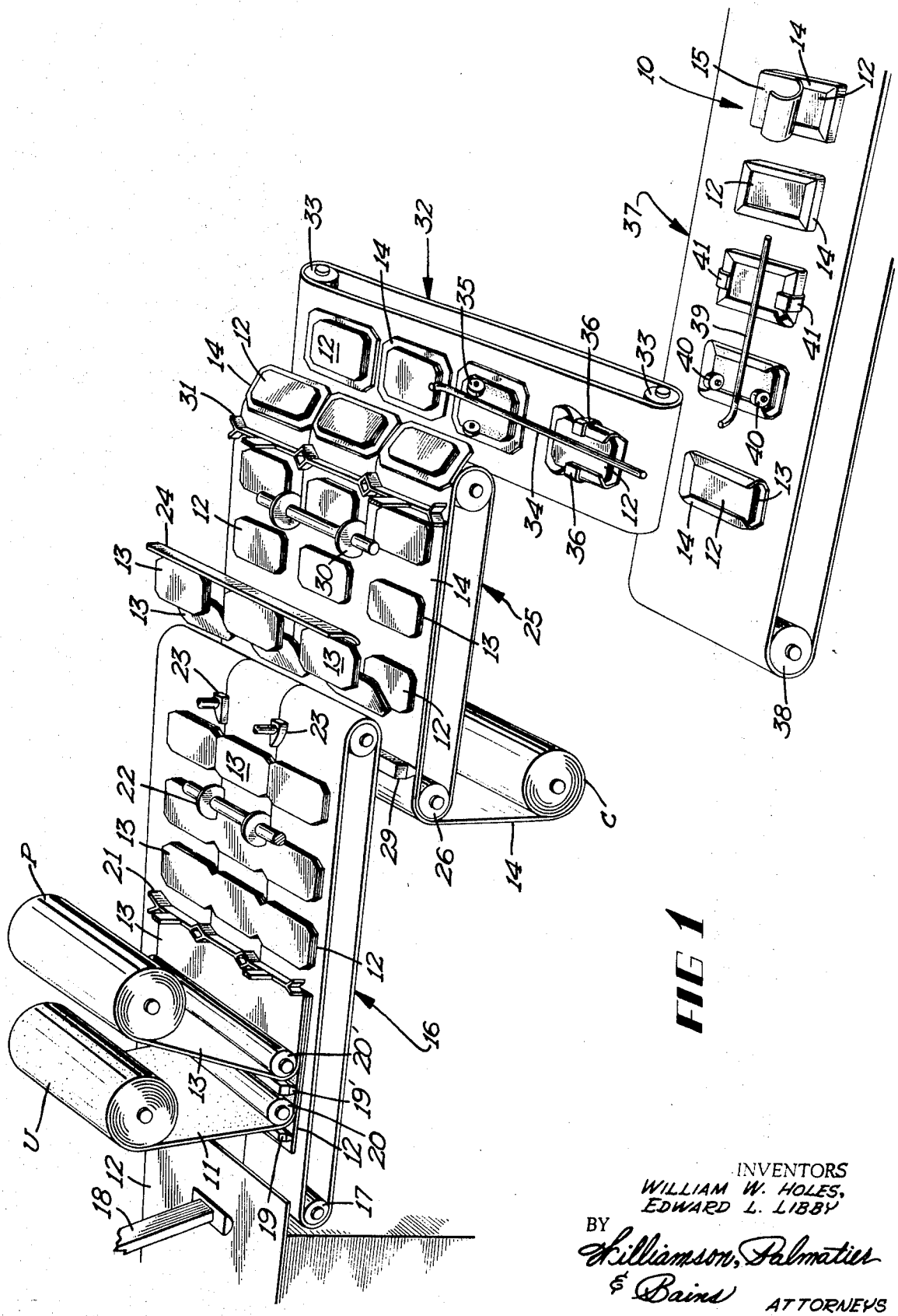
FIG. 1 is a perspective view diagrammatically illustrating an apparatus system for carrying out the method of making the novel laminated padding album cover.
Figure 2:
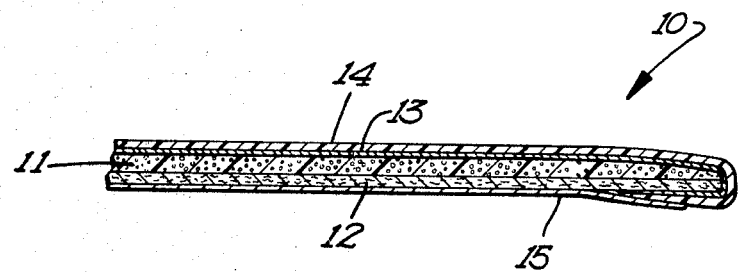
FIG. 2 is a fragmentary cross-sectional view of the laminated padded album cover illustrating details of construction thereof.
Figure 3:
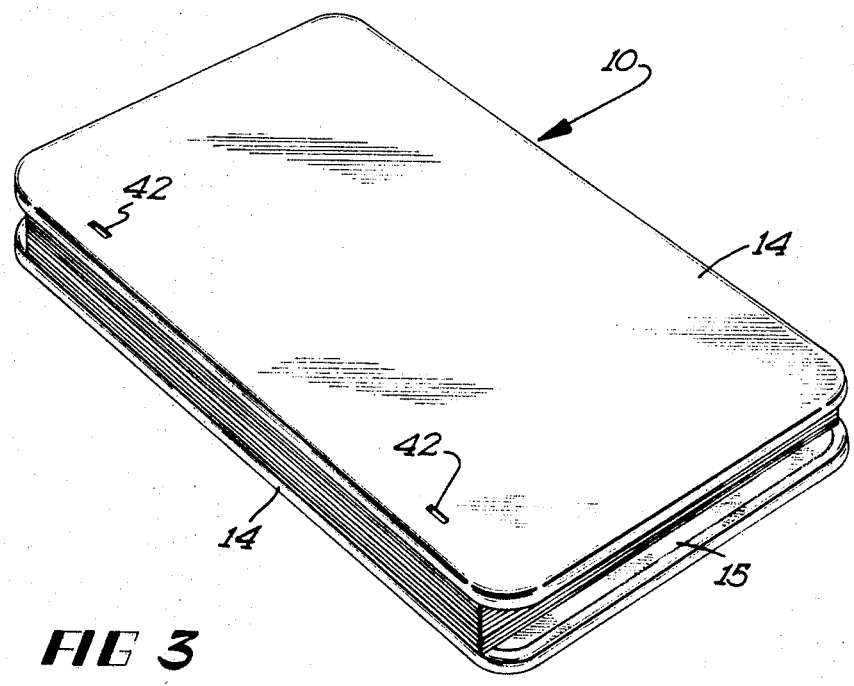
FIG. 3 is a perspective view of an album in an unassembled condition and illustrating the padded album cover.

Referring now to the drawings and more specifically to FIGS. 1 to 3 and 5 to 6, it will be seen that one embodiment of the novel album, designated generally by the reference character A is there shown. The album is comprised of front and rear padded covers designated in their entirely by the reference numeral 10 and a plurality of album pages 50, which are of identical construction. The pages 50 of the album are hingedly connected together and to the front and rear covers by suitable external hinge means, which are to be described hereinbelow.

Although padded album covers of laminated construction are now being made, these prior art laminated padded album covers are provided with binder edges that are subsequently added for the purpose of adding perforations therein through which the binding structure extends. In these prior art albums, books, booklets and the like, the hinge binding structure is substantially different from the external strap binding of the instant structure. In these prior art devices which have padded covers, there are no perforations or openings made through the padding of the cover, since the padding of these prior art devices would tend to shred through the openings thus formed. One of the unique features of the present album is the provision of a padded album cover, which is capable of having slots therein that extend through the padding material itself, so that the external hinge structure may be utilized.

The unique laminated padded album cover is comprised of a lamina or sheet 11, formed of an expanded non-fibrous material, preferably polyurethane, which has a cellular honeycomb-type construction. Expanded paper as well as other foam plastic materials may also be used in lieu of polyurethane. The sheet of polyurethane is of predetermined thickness and is of rectangular configuration and constitutes the core of the album cover. Because of the foamed nature, the polyurethane sheet 11 is yieldable and resilient and is also of lightweight construction.

A relatively thick, rigid sheet of cross-laminated paperboard 12 is bonded to one surface of the polyurethane sheet by a suitable adhesive means, such as commercial animal glue. A relatively thin, flexible protector sheet 13 formed of paper is bonded to the other surface of the polyurethane by a suitable adhesive or glue. In some instances, the protector sheet may be omitted, and the flexible, thin cover sheet may be applied directly to the expanded core 11. A protector sheet is utilized when a relatively large album cover is being made. It has been found that relatively poor adhesion occurs between the cover sheet and polyurethane, thus permitting the occurrence of wrinkles. It has also been found that when a core 11 is formed of a material having a relatively rough surface, the surface irregularities will be preceptible through the cover sheet. Protector paper is also used when it is desirable to obtain additional stiffness in the cover, since the paper does impart a degree of stiffness thereto.

The cover sheet 14 is bonded to the protector sheet 13 by a suitable adhesive, and this cover sheet is formed of a water impervious material, such as pyroxylin coated paper, vinyl, polyethylene or the like. It will be noted that the cover sheet 14 has length and width dimensions slightly greater than the dimensions of the sheets 11, 12 and 13, and the peripheral portions of the cover sheet are folded over the edges of the other laminae and are bonded to the marginal portions of the paperboard sheet by a suitable bonding agent, such as animal glue or the like. A relatively thin liner sheet 15 formed of a flexible paper is bonded to the other surface of the paperboard sheet 12 and to the folded marginal portions of the cover sheet 14 by a suitable bonding agent, such as glue or the like. The liner sheet 15 has length and width dimensions slightly smaller than the length and width dimensions of the sheets 11, 12 and 13.

Referring now to FIG. 1, it will be seen that one apparatus system for carrying out the various steps of forming the laminated padded album covers 10 is diagrammatically illustrated. This system includes an endless apron or belt-type conveyor 16, which is trained about rollers 17, one of which is driven and upon which is successively fed the sheets 12 of cross-laminated paperboard by conventional feeder mechanism 18. In travel of the paperboard sheets 12 upon the upper run of the apron conveyor 16, a suitable adhesive applying mechanism 19 positioned in close proximity to the apron conveyor, applies a liquid adhesive, such as glue, to one surface of the paperboard sheet. A roll U of polyurethane foam material, is continuously unwound and applied to the adhesive coated surface of the paperboard sheets by the cooperative action of the apron conveyor and a pressure roller 20.

A second adhesive applying mechanism 19′ disposed in close proximal relation to the apron conveyor 16 applies adhesive material, such as glue, to one surface of the polyurethane foam material 11. Protective paper 13 is unwound from a roll P thereof and is applied to the adhesive coated surface of the polyurethane foam sheet 11 by a second pressure roller 20′ which is positioned in close proximal relation to the upper run of the apron conveyor 16. The laminated paperboard, polyurethane and protector paper, are then cut into sheets by an elongate notch-type cutter mechanism 21. In the event a square corner type album is used, the cutter mechanism 21 would be straight to form right angular corners rather than beveled corners. It will be noted that this cutter mechanism also forms the beveled edges at the corner portions of the laminate for round-cornered albums. A revolvable cutter mechanism 22 cuts the large laminated sheets into smaller laminated sheets, which are engaged by suitable separator cams 23 disposed in close proximal relation to the upper run of the apron conveyor.

A deflector structure 24 is provided and is disposed in obstructing relation with respect to the discharge end of the upper conveyor and directs the laminates upon a second endless apron or belt conveyor 25, which is trained about rollers 26, one of which is driven. The conveyor 25, while being disposed at a slightly lower level than the conveyor 16, has its upper run moving in the same direction as the conveyor 16. The cover sheet 14 is unwound from a roll C thereof and a suitable adhesive, such as glue, is applied to one surface of this cover sheet by an adhesive applicator mechanism 29, which is disposed in close proximity to the upper run of the conveyor 25. The cover material is therefore applied to the laminate and specifically to the protector paper 13 thereof. To this end, it is pointed out that the deflector structure 24 causes the laminates to be turned as they fall downwardly upon the conveyor 25, so that the protector sheet faces downwardly. A multi-blade revolvable cutter mechanism 30 cuts the cover material into elongate strips and a notch-type cutter mechanism 31 cuts the strips of cover material into small sheets only slightly larger than the laminate to which it is bonded.

The laminate is then discharged from the apron conveyor 25 upon another belt or apron conveyor 32, which is trained about rollers 33, one of which is driven. The upper run of the conveyor 32 moves the laminate into engaging relation with a pressure rod 34, which applies downward pressure to the laminate as it passes adhesive applying rollers 35, which apply adhesive to the longitudinal edges of the paperboard sheet 12. The longitudinal edges of the cover material are engaged by a pair of folding cams 36, which fold the longitudinal edges of the cover material upon the adhesive coated longitudinal edges of the paperboard sheet 12 to bond the same thereto.

The laminate is then discharged upon another endless belt or apron conveyor 37, which is trained about suitable rollers, only one roller 38 being shown and the laminate is moved through another folding station where the transverse marginal edges of the cover are folded and bonded to the paperboard sheet. The laminate is moved by the upper run of the conveyor 37 and is engaged by a second elongate pressure rod 39, which applies downward pressure to a laminate as it is engaged by a pair of adhesive applying rollers 40 that apply an adhesive, such as glue, to the transverse marginal edges of the paperboard sheet 12. Folding cams 41 engage the cover material and fold the same into engaging relation to the transverse adhesive coated edges of the paperboard sheet so that the cover material is bonded thereto. Finally, the liner sheet 15, which has one surface thereof coated with a suitable adhesive, such as glue, is bonded to the paperboard sheet and to the folded marginal edge portions of the cover sheet. After the padded cover 10 has been laminated into its final form, the cover will be transferred to a punching station wherein elongate slots 42 are punched through the cover adjacent one longitudinal edge thereof. The use of polyurethane sheet material or other expanded cellular non-fibrous material as the core for the album cover, permits this punching without the attendant shredding or stringiness that characterizes the use of fibrous-type materials. It is pointed out that adhesive applying rollers 35 and 40 may be omitted especially when the edge folding station is adjacent the point at which the adhesive is applied to the cover. In such instances, the adhesive applied to the cover 14 by the applicator 29 will be in a substantially tacky condition and will bond the folded edge portions of the cover to the paperboard sheet. Although a generally square cornered cover has been described, it is also pointed out that the present process contemplates the formation of a round cornered cover. The manner of folding the cover material to form a round cornered cover is well-known in the art and suitable apparatus may be provided to perform this function in lieu of the arrangement shown.

Referring now to FIG. 4, it will be seen that a slightly modified arrangement of the apparatus system is there shown. Cross-laminated paperboard sheets 12a are fed upon the conveyor 16a by a suitable feeder mechanism 18a. The conveyor 16a is trained about rollers 17a and glue is applied to one surface of each paperboard sheet by an adhesive-applying mechanism 19a. Polyurethane material 11a is unwound from a roll U′ thereof and is applied to the adhesive coated surface of the paperboard as it passes below the pressure roller 20a. A notch-type cutter mechanism 21a cuts the laminate into large sheets, which are thereafter cut into the proper size by cutter mechanism 22a. This notch type cutter mechanism 21a is used in forming round type cornered albums while a straight type cutter mechanism will be used in forming square cornered albums. Separator cams 23a separate the laminates as they are discharged from the conveyor 16a and are turned by the deflector structure 24a, so that the polyurethane sheet faces downwardly as it falls upon conveyor 25a, which is trained about rollers 26a.

In this embodiment, the protector paper 13a is bonded directly to the cover sheet 14a and has the same width and length dimensions as the cover sheet. The protector sheet of paper 13a is unwound from a roll P′ thereof, and is passed between a pair of pressure rollers 27a. The cover material is also unwound from a roll C′ thereof and adhesives, such as glue, applied to one surface thereof by an adhesive applicator mechanism 28a. The cover material also passes between the pressure rollers 27a and is bonded to the protector paper. An adhesive applicator mechanism 29a applies adhesive to the unbonded surface of the protector paper so that the polyurethane sheet of the laminate will be bonded to the protector paper. A multi-blade revolvable cutter mechanism 30a and a notch-type cutter 31a cut the laminate to the proper size. The cover sheet is cut to have beveled corners to secure proper folds at the corners of the albums regardless of whether the album has square or round corners. The laminate is discharged upon conveyor 32a trained about rollers 33a and downward pressure is applied to each laminate by a pressure rod 34a, as each laminate is moved below but in contacting relation with adhesive applying rollers 35a. The longitudinal edges of the cover material and protector paper are engaged by folding cams 36a, which fold the longitudinal edges into contacting relation with the adhesive coated longitudinal edges of the paperboard sheet 12a to bond the same thereto.

The laminate is then discharged upon endless conveyor 37a trained about rollers 38a (only one being shown) and a second elongate pressure rod 39a applies downward pressure to each laminate as it is engaged by adhesive applying rollers 40a, which apply adhesive to the transverse marginal portions of the paperboard sheet 12a. Folding cams 41a fold the transverse marginal portions on the cover material and protector paper into bonding relation with the transverse adhesive coated portions of the paperboard sheet 12a. Adhesive applying rollers 35a and 40a may also be omitted if desired, especially where the cover material is folded before the adhesive discharged from applicator 29a has become set. Thereafter, the liner sheet 15a, which has one surface thereof coated with a suitable adhesive, is bonded to the paperboard sheet and to the folded marginal edge portions of the cover sheet. The padded covers 10 are then passed to a punching station wherein elongate slots are punched through the cover adjacent one longitudinal edge thereof. It is pointed out that the apparatus system as illustrated in FIGS. 1 and 4 are capable of continuous high production operation.

Referring now to FIGS. 5, 6 and 7, it will be seen that the details of construction of the album A is there shown. The album A includes front and rear padded covers 10 and a plurality of substantially identical pages 50. Each page 50 is formed of a suitable somewhat rigid paper of material and each has an elongate reinforcing strip 51 applied to its outer marginal edge. One surface of the retaining strip 51 has an adhesive coating applied thereto in a well-known manner. Retaining strips 51 are employed on photograph album pages that utilize transparent sleeves to prevent accidental removal of the sleeves. The strips 51 may be omitted when the pages are used in albums, such as scrapbooks. The inner longitudinal edge of each page 50 also has an elongate adhesive coated strip 52 applied thereto and each strip has a pair of generally U-shaped hinge elements 53 secured thereto and projecting outwardly therefrom. These U-shaped hinge elements penetrate the strip 52 and have their innermost ends (not shown) offset inwardly towards each other in the manner of a conventional staple. The pairs of hinge elements on each page are disposed in registering relation with hinge elements of other pages and a pair of elongate hinge flexible members or straps 54 are laced through the aligned registering hinge elements, as best seen in FIG. 5. These straps are formed of a suitable flexible material such as plastic or the like.

Opposite ends of each hinge strap 54 then passes through the adjacent opening or slot 42 in the front and rear covers and projects outwardly adjacent the inner surface of the padded cover. Each front and rear cover has an elongated cover holder 55 associated therewith for releasably locking the associated ends of the hinge straps 54. Each cover holder 55 is formed of an elongate relatively rigid strip of paper and has a reinforcing strip of flexible material 56 applied to its inner longitudinal edge thereof. One surface of the flexible strip 56 is provided with a suitable adhesive material through which project a pair of hinges. Each cover holder has a pair of elongate openings 57 formed adjacent each end portion thereof and opposite ends of each flexible strap is looped through the openings 57, as best seen in FIG. 6. This hinge arrangement constitutes an external hinge structure, thus permitting the pages to lie flat when the album is opened, as best seen in FIG. 6. This arrangement also allows the pages to be easily turned and permits the incorporation of additional pages with a minimum of effort. By using a resilient, yieldable core for the padded covers, which is formed of a cellular, expanded, non-fibrous material, such as polyurethane, openings may be formed in the cover for receiving the ends of the hinge straps therethrough without the attendant shredding and stringiness associated with certain prior art devices. Although in the embodiment shown, padded covers are used for both the front and rear covers, it is pointed out that in some instances only the front cover will be padded.

From the foregoing description, it will be seen that we have provided a novel album having laminated padded covers and also having a unique external hinge structure releasably hinging the pages to the front and rear covers. The external hinge structure may be utilized with the padded covers, since openings are made directly through the padded covers, without the attendant stringiness or shredding associated with heretofore known padded covers. These prior padded covers have a binding portion hinged to one longitudinal edge thereof, through which the binding elements such as laces, strings, screw posts, or the like project. Those binding portions which are not padded are joined to the cover whereby the cover is of two piece construction. The hinge used in this type prior art album is an internal hinge whereby when the album is opened, the pages merely tend to fan out and do not lie flat.

It is pointed out that the album pages 50 may have suitable transparent sleeves or folded sheets enclosing the same for permitting the use of the album as a photograph album.

Thus, it will be seen that we have provided a novel album, which is not only of unique construction, but one which functions in a more efficient manner than any heretofore known comparable device.

It will, of course, be understood that various changes may be made in the form, details, arrangement and proportions of the various parts without departing from the scope of our invention.

What is claimed is:

1. A continuous process for forming a laminated padded album cover having slots therein, said process comprising the steps of:
successively moving flat sheets of foamed plastic material of predetermined thickness and relatively thick rigid sheets of laminated paperboard through a predetermined path of travel,
during said travel successively bonding each sheet of paperboard to one surface of each foamed plastic sheet,
successively applying and bonding a flexible protector sheet of paper to the other surface of each foamed plastic sheet during travel thereof, said paperboard, foamed plastic, and paper sheets having substantially the same length and width dimensions but having different thickness dimensions,
applying and bonding a flexible cover sheet of plastic material to said protector sheet, said cover sheet having length and width dimensions slightly larger than said paperboard, foamed plastic and paper sheets,
folding the peripheral portions of said cover sheet over the edges of said bonded paperboard, foamed plastic and paper sheets, and bonding these peripheral portions to the marginal portions of said paperboard sheet,
advancing said bonded sheets and during movement thereof applying a flexible liner sheet formed of paper to said paperboard sheet, said flexible liner sheet having slightly smaller width and length dimensions than said paperboard sheet and being bonded thereto into the folded marginal edges of said cover sheet to thereby form a multi-ply laminated album cover, and thereafter applying a pressure medium to said multi-ply laminated album cover adjacent one marginal edge portion thereof to form a plurality of elongate slots therein extending through all of the laminae.

2. The process as defined in claim 1 wherein said foamed plastic material comprises polyurethane.

(References on following page)

References Cited

UNITED STATES PATENTS

| | | | |
|---|---|---|---|
| 1,506,997 | 9/1924 | Pitt | 156—216 X |
| 1,609,320 | 12/1926 | Smith | 156—216 X |
| 2,970,634 | 2/1961 | Hantscho | 156—216 X |
| 3,145,033 | 8/1964 | Caddoo | 281—29 |
| 3,190,678 | 6/1965 | Peterson et al. | 281—29 |
| 3,215,450 | 11/1965 | Peterson et al. | 281—29 |

SAMUEL W. ENGLE, Primary Examiner

U.S. Cl. X.R.

156—271, 479; 281—29